June 26, 1928.

W. K. ANDREW

INDEXING AND CLAMPING DEVICE

Filed May 2, 1925

1,675,150

3 Sheets-Sheet 1

William K. Andrew
INVENTOR.

BY Fred G. Parsons
ATTORNEY

June 26, 1928.  
W. K. ANDREW  
1,675,150  
INDEXING AND CLAMPING DEVICE  
Filed May 2, 1925  3 Sheets-Sheet 2
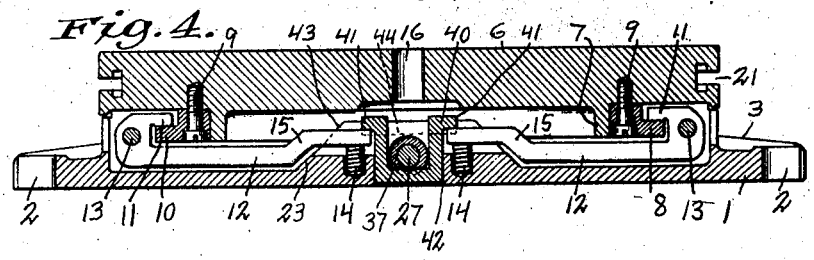
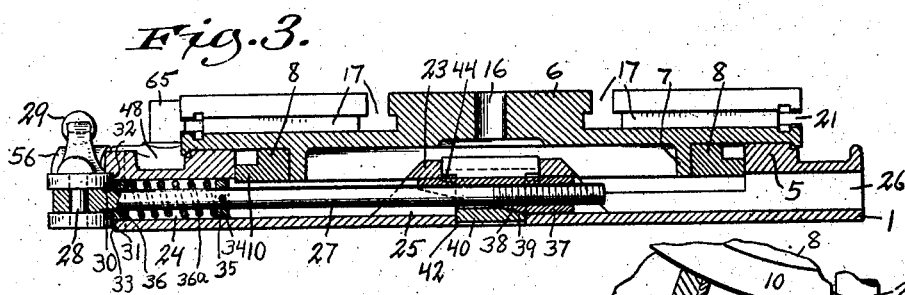
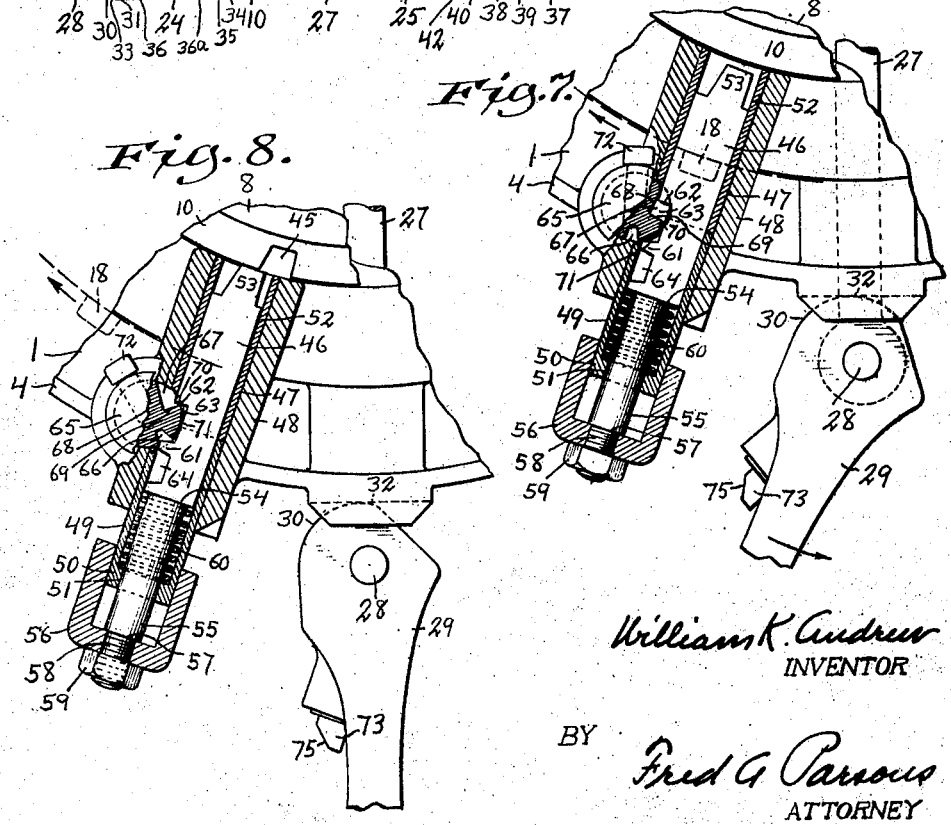
William K. Andrew  
INVENTOR  
BY Fred G. Parsons  
ATTORNEY June 26, 1928.

W. K. ANDREW 1,675,150

INDEXING AND CLAMPING DEVICE

Filed May 2, 1925   3 Sheets-Sheet 3

William K Andrew
INVENTOR.

BY Fred G Parsons
ATTORNEY

Patented June 26, 1928.

1,675,150

UNITED STATES PATENT OFFICE.

WILLIAM K. ANDREW, OF MILWAUKEE, WISCONSIN, ASSIGNOR TO KEARNEY & TRECKER CORPORATION, OF WEST ALLIS, WISCONSIN, A CORPORATION.

INDEXING AND CLAMPING DEVICE.

Application filed May 2, 1925. Serial No. 27,466.

This invention relates to indexing and clamping devices, and the object of the invention is to improve the construction and operation of indexing and clamping means in the manner to be hereinafter described and claimed.

Figure 1:
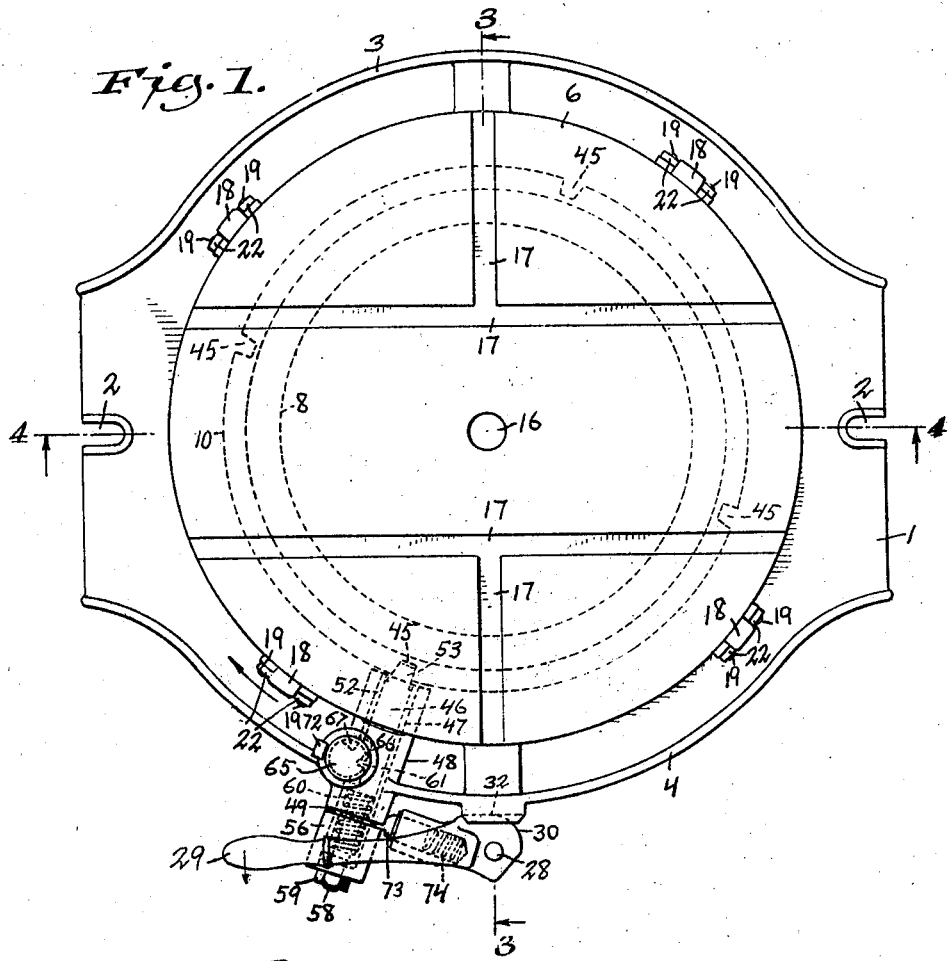
Figure 2:
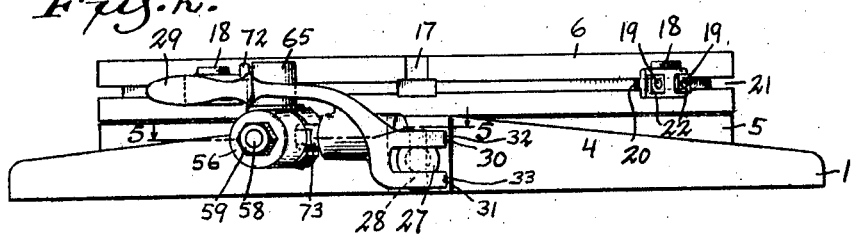

Referring to the drawings, which accompany this specification and form a part hereof, which drawings illustrate an embodiment of this invention as applied to an index table attachment, and on which drawings the same reference characters are used to designate the same parts wherever they may appear in each of the several views, Fig. 1 is a plan view of the index table attachment and associated mechanism; Fig. 2 is an elevation of the mechanism shown by Fig. 1; Fig. 3 is a cross-section, taken on the line 3—3 on Fig. 1, looking in the direction indicated by the arrows; Fig. 4 is a cross-section, taken on the line 4—4 on Fig. 1, looking in the direction indicated by the arrows; and Figs. 5, 6, 7 and 8 are plan views of parts of the mechanism, parts being broken away and parts being shown in section.

Referring to the drawings, the reference numeral 1 designates a base provided with slots 2 for the reception of bolts, not shown, by which the mechanism may be secured to the reciprocable table of a machine, such as, for example, the table of a milling machine. The base 1 is illustrated as provided with flanges 3 and 4 to prevent the escape of the liquid used with a cutting tool and return it to the table, to which the mechanism is bolted, to return it to a suitable receptacle for further use. These flanges are only necessary, for the purpose stated, when the base is of greater width than the table to which it is to be attached. The base 1 is provided with a cylindrical flange 5, on top of which is mounted the table 6. The table 6 is illustrated by the drawings as provided with a depending cylindrical flagne 7 which is concentric with the cylindrical flange 5 on the base 1, and a ring 8 is secured by bolts 9 on the under side of the table 6 between the cylindrical flanges 5 and 7. This ring 8 accurately centers the table 6 with respect to the cylindrical flange 5 of the base 1 and permits the table 6 to be rotated with respect to the base 1 in a manner which will be readily understood. The ring 8 is cut away so as to form a ledge 10 over which the short arms 11 of clamping levers 12 extend. The clamping levers 12 are pivoted to the base 1 by pivots 13, and springs 14, which are of the open or compression type, are inserted between the base 1 and the long arms 15 of the clamping levers 12 to lift the short arms 11 of these clamping levers free from the ledge 10 of the ring 8 when the table is unclamped.

The table 6 is illustrated as provided with a central cylindrical hole 16 for the reception of a pin, or an equivalent member, to center work with respect to the table, and its upper face is provided with T-slots 17 for securing work to the table in a manner which will be readily understood. One or more tripping dogs 18 may be secured to the table, for a purpose to be hereinafter described, and it is preferred that these tripping dogs 18 be secured to the table in such a manner that they are readily removable from the table and adjustable with respect to the periphery of the table. The drawings illustrate these tripping dogs 18 as secured to the table 6 by means of bolts 19, the heads 20 of which engage in a T-slot 21 which extends around the cylindrical face or periphery of the table in a plane with the T-slots 17 in the top of the table. By loosening the nuts 22, the tripping dogs 18 can be moved to any desired positions, and by removing the nuts 22, one or all of the tripping dogs can be removed from the table. The bolts 19 can be removed from the T-slot 21 by moving them to an intersection of the T-slot 21 with a T-slot 17, as will be readily apparent from an inspection of Fig. 2 of the drawings, because of the enlarged lower parts of the T-slots 17 opening through the cylindrical face of the table for the insertion of bolts into the T-slots 17.

The base 1 is provided with a central, outstanding projection 23, and the base is bored through from side to side, including the projection 23, forming bores 24, 25 and 26, the axes of which are in the same straight line and this line intersects the axis of the table 6. A rod 27 is pivotally connected, by a pivot 28, with a handle 29. The handle 29 is formed with cams 30 and 31 which bear against substantially plane surfaces 32 and 33 on the base 1 above and below the bore 24. A collar 34 is secured to the rod 27 by a pin 35, for example, and an abutment 36 is placed in the outer end of the bore 24. A spiral spring, of the open or compression type, 36ᵃ surrounds the rod 27 between the collar 34 and the abutment 36 and tends to press the rod 27 inwardly. A cam or wedge member 37 is secured to the rod 27 within the bore 25. This cam or wedge member 37 is illustrated by Fig. 3 of the drawings as a cylindrical nut screwed onto the screw-threaded end of the rod 27 so that it may be adjusted lengthwise with respect to the rod 27. A part of this cam or wedge member 37 is cut away in a plane leaving a wedge-shaped part 38 which bears against a wedge-shaped part 39 of a lever operating member 40. This lever operating member 40 is illustrated by the drawings as of a rectangular U-shape in cross-section with its lips 41 extending over the long arms 15 of the clamping levers 12. An aperture 42 is provided through the projection 23 and the base 1 for the reception of the lever operating member 40, and the projection 23 is provided with a slot 43 for the long arms 15 of the clamping levers 12 and a shallower, transverse slot 44 for the lips 41 of the lever operating member 40. Looking at Fig. 3 of the drawings, it will be readily understood that a movement of the rod 27 toward the left will depress the lever operating member 40 and depress the long arms 15 of the clamping levers 12 with the result that the table 6 will be immovably clamped to the base 1, while a movement of the rod 27 to the right will release the short arms 11 of the clamping levers 12 from the ring 8 so that the table can be rotated.

The ring 8 is provided with one or more index notches 45 for the reception of an index pin 46 to retain the table 6 in a predetermined position or positions for tool operation upon an article or articles secured to the table. Fig. 1 of the drawings illustrates four index notches so that the table can be turned a quarter of a revolution before it is stopped by the index pin entering an index notch. In this way the operator of a machine, a milling machine for example, can remove finished work from the table and place work to be finished on the table while work on the table is being operated upon by a machine tool.

In order to decrease the number of movements to be made by the operator of a machine, provision is made so that the index pin is removed from an index notch during the unclamping of the table. The drawings illustrate a construction for this purpose which will now be described.

The index pin 46 is reciprocatable within the bore 47 of a boss 48 formed as an integral part of the base 1. The index pin 46 is movable in a line intersecting the center of the table 6, or radially with respect to the table 6. A sleeve 49 is secured in the bore 47 of the boss 48 and is provided with a head 50 with an aperture 51 therethrough. A bushing 52 may also be secured in the bore 47 of the boss 48. The index pin 46 is provided with an end 53 suitably shaped to enter an index notch 45 and hold the table 6 in an accurate predetermined position. It is also provided with a shoulder 54, a reduced part 55, which passes through the aperture 51 in the sleeve 49 and to the end of which is secured a cap 56. The drawings illustrate an end of the reduced part 55 of the index pin 46 as provided with a shoulder 57 and a screwthreaded end 58 with the cap 56 clamped between the shoulder 57 and a nut 59. A spiral spring 60 surrounds the reduced part 55 of the index pin 46 and bears against the shoulder 54 and the head 50 of the sleeve 49. This spiral spring 60 is of the open or compression type and its tendency is to force the end 53 of the index pin 46 away from the head 50 of the sleeve 49 and to engage the end 53 of the index pin in an index notch 45, when permitted to do so. The index pin 46 is provided with a motion producing member 61 which may be a gear tooth, as illustrated by the drawings. The index pin 46 is also provided with another motion producing member 62. These two motion producing members can be conveniently formed by cutting slots 63 and 64 into the side of the index pin 46, forming the motion producing member 61 as a gear tooth and forming the motion producing member 62 as an abutment which is substantially at right angles with the face of the index pin 46. A lock 65 is provided to hold the index pin 46 in a retracted position. This lock 65 is illustrated by the drawings as a member which is rotatable about an axis perpendicular to a plane coincident with the plane of longitudinal movement of the index pin 46. The lock is provided with a notch 66, within which the motion producing member or gear tooth 61 can engage to turn the lock about its axis, and the lock is also provided with a substantially right-angled notch 67, which provides flat faces 68 and 69 which are substantially at right angles to each other. From the point 70 to the notch 66 the contour of the lock is substantially that of the arc of a circle struck from the axis of rotation of the lock. The point to be observed in this connection is that this arc-shaped surface 71 shall not permit the motion producing member or gear tooth 61 to rotate the lock. The lock 65 is also provided with a part 72 which will be contacted with by a tripping dog 18 so as to partially rotate the lock. The handle 29 is provided with a latch 73 which is pressed outwardly by a spring 74. The latch 73 is adapted to engage the cap 56 when the handle 29 is moved into a position to clamp the table 6 to the base 1. The latch 73 can be disengaged from the cap 56, as the handle 29 is moved in one direction, and it is provided with a beveled face 75, so that it can be re-engaged with the cap 56 after it has been disengaged therefrom.

Figure 5:
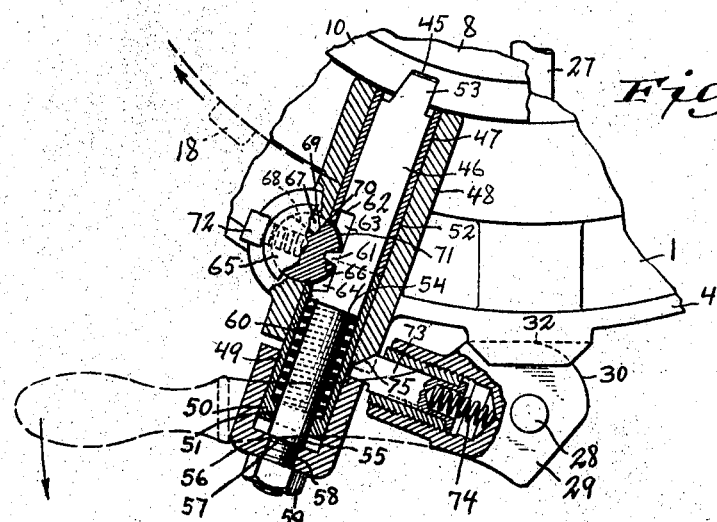
Figure 6:
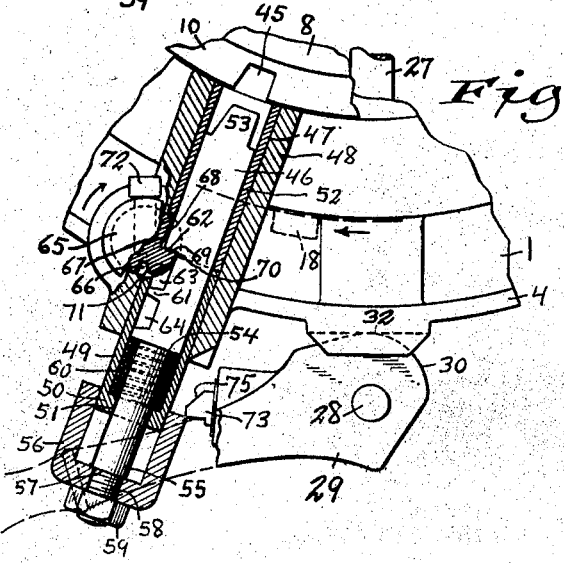

The operation of the mechanism will be readily understood from an inspection of the drawings and the foregoing description supplemented by the following description:

Assuming that the parts are in the positions illustrated by Figs. 1, 2, 3, 4 and 5 of the drawings, and that milling, for example, of work, not shown, on the table 6 has been completed so that the operator wishes to rotate the table to a position for milling a piece of work already fastened to the table. It will also be understood that the operator has removed from the table immediately opposite him a piece of work which has been milled and has replaced it by a piece of work to be milled. The operator takes hold of the handle 29 and moves it in the direction of the arrows shown on the drawings. This movement of the handle performs two operations simultaneously, but these two operations must be described separately. A complete movement of the handle 29 to its intended limit of movement unclamps the table 6 from the base 1 by permitting the rod 27 to be moved to the right whereby the springs 14 release the short arms 11 of the clamping levers 12 from the ledge 10 of the ring 8. When the handle 29 starts its movement, the latch 73 moves the cap 56 and the index pin 46 outwardly to disengage the end 53 of the index pin 46 from the index notch 45 in which it was seated. This movement of the index pin compresses the spring 60 and the motion producing member or gear tooth 61, which is engaged in the notch 66 of the lock 65, rotates the lock about its axis of rotation in the direction shown by the arrow on Fig. 6 of the drawings. The rotation of the lock in this direction, if continued far enough, will bring the part or projection 72 into the path of movement of the tripping dogs 18. This operation will be readily understood from an inspection of Fig. 5 of the drawings which shows the parts in the positions which they occupy when the end 53 of the index pin 46 is seated in an index notch 45. Fig. 5 also shows the handle in its clamping position. Now, referring to Fig. 6 of the drawings, the handle 29 has been moved in the direction indicated by the arrow until the latch 73 is at the point of being released from the cap 56. As the cap 56 and the index pin 46 were moved outwardly, the motion producing member or gear tooth 61 rotated the lock to the position where the motion producing member 62 contacted with the point 70 on the lock and continued the rotation of the lock to the position shown by Fig. 6 of the drawings. The rotation of the lock was definitely stopped by the flat face 68 of the notch 67 contacting with the index pin 46. In this position of the lock, if the index pin 46 were to be moved inwardly by the spring 60, the motion producing member or gear tooth 61 would contact with the arc-shaped surface 71 and stop further movement of the index pin 46 and without producing any rotation of the lock 65. When the latch 73 is released from the cap 56 by further movement of the handle 29, the spring 60 moves the index pin 46 and cap 56 inwardly towards the ring 8 until the motion producing member or gear tooth 61 contacts with the arc-shaped surface 71 on the lock 65, as clearly shown by Fig. 7 of the drawings. Further inward movement of the index pin 46 is now arrested until a tripping dog 18 strikes the part or projection 72 and rotates the lock 65 in the opposite direction far enough for the motion producing member or gear tooth 61 to engage within the notch 66 and continue the rotation of the lock until the index pin 46 contacts with the ring 8. After the index pin 46 has contacted with the ring 8 it is still possible for it to be moved further and the lock 65 to be rotated further by the spring 60 when an index notch 45 is moved to the proper position to receive the end 53 of the index pin 46.

It will be understood, of course, that, after the table 6 has been unclamped, the operator rotates the table in the direction indicated by the arrow on Fig. 1 of the drawings until its further rotation is stopped by the index pin 46 having its end 53 seated in an index notch 45 by the spring 60, and that, when the operator then clamps the table by the handle 29, the latch 73 will pass by the cap 56 to again engage with the cap 56.

It will thus be seen that the operator simply moves the handle 29 for unclamping the table and withdrawing the index pin 46; that the index pin is automatically seated in its index notch; that, no matter how many index notches there may be in the ring 8, the proper positioning of one or more tripping dogs predetermines the possibility of the index pin seating in any particular or selected index notch; and that the operator has one hand always free for turning the table or for other purposes.

What I claim is:

1. The combination with a movable member, of index means engageable with the member, means movable to clamp and unclamp the member, means operative simultaneously with the unclamping movement to release the index means and means operable independently of the clamp means to re-engage the index means.

2. The combination with a movable member, of index means adapted to coact with the member, clamping means for the member, means associated with the clamping means to release the index means when the member is being unclamped and to restrain said index means in a released position during a portion of member movement, and means adapted to automatically re-establish the coaction of the index means with the member during movement of the member.

3. The combination with a movable member, of a movable index pin, clamping means for the member, a lock for the index pin, means for forcing the index pin into engagement with the member, means associated with the clamping means for withdrawing the index pin and actuating said lock, and means carried by the member for releasing said lock.

4. The combination with a movable member provided with an index notch, of an index pin, clamping means for the member, a spring adapted to force the index pin towards the member, means associated with the clamping means for moving the index pin away from the member and compressing said spring, a lock, said index pin and said lock being provided with coacting parts to move said lock to retain the index pin in a retracted position, and said member being provided with means to release said lock.

5. The combination with a movable table provided with an index notch and a dog, of an index pin, clamping means for the table, a latch for communicating motion from the clamping means to the index pin to release the index pin from the table, an oscillatable lock provided with a notch and a point and a substantially arc-shaped part between said point and said notch, the index pin being provided with motion producing members, one of which is adapted to engage within the notch in the lock and another being adapted to engage against the point on the lock to turn the lock so that said first mentioned motion producing member can contact with the arc-shaped part of the lock to stop movement of the index pin towards the table, said lock also being provided with a part adapted to be contacted by the dog on said table.

6. The combination with a rotatable table provided with an index notch and a dog, of a reciprocatable index pin, clamping means for the table, a handle for said clamping means, a spring actuatable latch carried by said handle and adapted to move the index pin away from the table when the handle is moved to unclamp the table, a lock oscillatable about an axis substantially perpendicular to the plane of movement of the index pin, a spring for moving said index pin towards the table, the index pin being provided with a gear tooth and another motion producing part, the lock being provided with a notch adapted to coact with said gear tooth and also being provided with a point adapted to be contacted by the other motion producing part to turn the lock to a position where the gear tooth is disengaged from the notch, the lock having an arc-shaped part extending from said point to said notch and adapted to be contacted by said gear tooth without the gear tooth moving said lock, and the lock being provided with a part adapted to be contacted by said dog to partly turn the lock.

7. The combination with a rotatable table provided with an index notch and a dog, of a movable index pin, a spring for moving said index pin towards the table, clamping means for the table including a handle, means for communicating motion of the handle to the index pin when the table is being unclamped, an oscillatable lock, means movable with said index pin to oscillate the lock to a locking position, and the lock being provided with a part adapted to be contacted by said dog to move the lock into a position to be oscillated by said spring.

8. The combination with a movable table of clamp means including a movable portion, locating means including an index pin connected with said clamp means to be disengaged from said table when said portion is moved to unclamp said table, an index pin lock, means associated therewith and with said clamp means whereby said index pin is locked when said portion is moved as described, said lock having associated therewith a lock releasing part, and a dog on said table; said part being movable into the path of movement of said dog.

9. The combination with a movable member of index means adapted to coact with said member including an index pin, a spring tending to urge said pin to engage with said member, a lever connected to overcome said spring and move said index pin to disengage from said member, and means to re-establish the engagement of said pin and member independently of movement of said lever including a dog movable with said member and a part movable into the path of movement of said dog.

10. The combination with a movable member having a plurality of index notches, of index means, including an index pin positioned for engagement with said notches and a spring tending to urge said pin into such engagement, a lever for withdrawing said pin, lock means restraining said pin when withdrawn and during movement of said member sufficient to move one of said notches past said pin, and means for thereafter moving said lock so that said pin may re-engage said member, including a removable dog movable in unison with the member movement and a part movable into the path of movement of said dog.

11. The combination with a movable member provided with a notch for an index pin for retaining the member in a predetermined position, of a movable index pin, clamping mechanism for the member operatively associated with the index pin to retract the index pin from said notch and the member when the member is being unclamped, a lock adapted to retain the index pin in a retracted position during a part of a movement of the member, and means for forcing the index pin against the member and into the notch, the member being provided with means to actuate the lock to release the index pin prior to registry of the index pin with the notch.

In witness whereof I hereto affix my signature.

WILLIAM K. ANDREW.